United States Patent
Cremer et al.

(10) Patent No.: US 6,388,364 B1
(45) Date of Patent: May 14, 2002

(54) PIEZOELECTRIC ROTATOR

(75) Inventors: Ed Cremer, Woodlawn; Scott Bradshaw, Ottawa, both of (CA)

(73) Assignee: Optovation (Canada) Corp., Ottawa (CA)

( * ) Notice: Subject to any disclaimer, the term of this patent is extended or adjusted under 35 U.S.C. 154(b) by 0 days.

(21) Appl. No.: 09/810,710

(22) Filed: Mar. 15, 2001

(51) Int. Cl.$^7$ ............................................... H01L 41/08
(52) U.S. Cl. ................... 310/323.02; 310/328
(58) Field of Search ............................. 310/328, 323.02

(56) References Cited

U.S. PATENT DOCUMENTS

| | | |
|---|---|---|
| 3,902,084 A | 8/1975 | May, Jr. |
| 4,714,855 A | 12/1987 | Fujimoto |
| 4,814,660 A * | 3/1989 | Yamada et al. ............. 310/328 |
| 4,950,135 A * | 8/1990 | Tojo et al. ............. 310/328 X |
| 5,001,382 A * | 3/1991 | Umeda et al. ............. 310/328 |
| 5,052,119 A | 10/1991 | Eventoff |
| 5,089,740 A * | 2/1992 | Ono ............. 310/328 |
| 5,747,915 A | 5/1998 | Benavides |
| 5,939,816 A | 8/1999 | Culp |
| 6,066,911 A * | 5/2000 | Lindemann et al. ... 310/323.02 |
| 6,121,717 A * | 9/2000 | Diefenbach et al. ... 310/323.02 |
| 6,147,436 A * | 11/2000 | Claeyssen et al. ..... 310/323.02 |

OTHER PUBLICATIONS

Piezo Systems, Inc., "Ultrasonic Rotary Motor", http://www.piezo.com/ru30.html, Cambridge Massachusetts Jan. 7, 2001.

* cited by examiner

*Primary Examiner*—Mark O. Budd
(74) *Attorney, Agent, or Firm*—Freedman & Associates

(57) ABSTRACT

Embodiments of the present invention are directed to rotational actuators or rotators that rotate an object in a wormlike manner. One rotator includes piezoelectric members that are controlled to expand and contract in a predetermined sequence to rotate a ring. The rotator includes first and second coupling members which are adjustable in length to move between a coupled position being coupled with the ring and a decoupled position being decoupled from the ring. A top advancing member is connected between the top coupling end of the first coupling member and the top coupling end of the second coupling member. A bottom advancing member is connected between the bottom coupling end of the first coupling member and the bottom coupling end of the second coupling member. The top and bottom advancing members are adjustable in length to produce relative movements between the top coupling ends and between the bottom coupling ends, respectively.

20 Claims, 4 Drawing Sheets

PIEZOELECTRIC ROTATOR

BACKGROUND OF THE INVENTION

This invention relates generally to rotational actuators and, more particularly, to a rotational actuator that rotates an object in a worm-like manner.

Inchworm linear motors are piezoelectromechanical actuators that drive objects in a worm-like manner. An example of an inchworm motor is shown in FIG. 1. The driver or motor 10 typically includes three piezoelectric driver sections referred to as the forward section 12, center section 14, and rear section 16 with respect to the desired direction of movement of a linear member 20 about which the driver 10 is arranged.

In operation, a voltage is applied to the forward section 12, causing it to clamp the linear member 20 with a pair of grip members 22 attached to opposite ends of the forward section 12. A variable rate staircase voltage is applied to the center section 14 causing it to expand. The rear section 16 is attached to a housing or a stationary member. Thus, the expansion of the center section 14 drives the forward section 12 and the linear member 20 in a forward direction. A voltage is then applied to the rear section 16, causing it to clamp the linear member 20 with a pair of grip members 24 attached to opposite ends of the rear section 16. The voltage on the forward section 12 is subsequently removed, loosening the grip of the forward section 12 on the linear member 20. The staircase voltage on the center section 14, its upper limit having been reached prior to or substantially simultaneously with the application of the voltage to the rear section 16, then starts downward towards its lower limit, causing the center section 14 to contract to its original length. After the center section 14 has contracted, a voltage is then applied to the forward section 12, causing it to clamp the linear member 20, and the sequence of steps outlined above are repeated to move the linear member 20 forward in a worm-like manner.

SUMMARY OF THE INVENTION

Embodiments of the present invention are directed to rotational actuators or. rotators that move in a worm-like manner in rotation. A rotator includes piezoelectric members that are controlled to expand and contract in a predetermined sequence to rotate one object relative to another object such as a stationary support.

In accordance with an aspect of the present invention, a rotator for rotating a ring comprises a first coupling member which is adjustable in length to move between a coupled position and a decoupled position. The first coupling member has top and bottom coupling ends being coupled with the ring in the coupled position and being decoupled from the ring in the decoupled position. The rotator further comprises a second coupling member which is adjustable in length to move between a coupled position and a decoupled position. The second coupling member has top and bottom coupling ends being coupled with the ring in the coupled position and being decoupled from the ring in the decoupled position. A top advancing member is connected between the top coupling end of the first coupling member and the top coupling end of the second coupling member. The top advancing member is adjustable in length to move one top coupling end with respect to the other top coupling end. A bottom advancing member is connected between the bottom coupling end of the first coupling member and the bottom coupling end of the second coupling member. The bottom advancing member is adjustable in length to move one bottom coupling end with respect to the other bottom coupling end.

In some embodiments, the coupling members and advancing members are piezoelectric. A controller controls electrical voltages supplied to each of the coupling members and advancing members to adjust the lengths of the coupling members and advancing members. The coupling members may be attached to a stationary support.

In accordance with another aspect of the invention, a rotator for rotating a ring comprises a first piezoelectric coupling member which is adjustable in length to move between a coupled position and a decoupled position. The first coupling member has top and bottom coupling ends pressing against an inner surface of the ring in the coupled position and being spaced from the inner surface of the ring in the decoupled position. The rotator further comprises a second piezoelectric coupling member which is adjustable in length to move between a coupled position and a decoupled position. The second coupling member has top and bottom coupling ends pressing against the inner surface of the ring in the coupled position and being spaced from the inner surface of the ring in the decoupled position. A mechanism is coupled with the first and second piezoelectric coupling members for moving one piezoelectric member with respect to the other piezoelectric member in rotation with respect to the ring.

In accordance with another aspect of the present invention, a method of rotating an object comprises:

(a) coupling a first coupling member to the object and decoupling a second coupling member from the object, the first coupling member including a top coupling end and a bottom coupling end, the second coupling member including a top coupling end connected with the top coupling end of the first coupling member by a top advancing member, and a bottom coupling end connected with the bottom coupling end of the first coupling member by a bottom advancing member;

(b) adjusting a length of at least one of the advancing members to-move the second coupling member relative to the first coupling member in rotation with respect to the object;

(c) coupling the second coupling member to the object and decoupling the first coupling member from the object; and (d) adjusting the length of at least one of the advancing members to move the first coupling member relative to the second coupling member in rotation with respect to the object.

In some embodiments, the lengths of the top and bottom advancing members are increased in (b) to move the second coupling member relative to the first coupling member in rotation with respect to the object. The lengths of the top and bottom advancing members are decreased in (d) to move the first coupling member relative to the second coupling member in rotation with respect to the object.

DESCRIPTION OF THE SPECIFIC EMBODIMENTS

Figure 1:
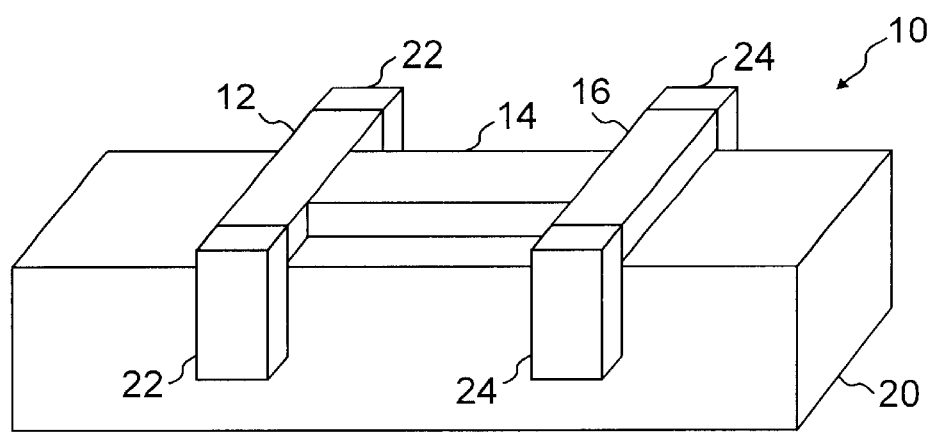
FIG. 1 is a perspective view of a linear inchworm motor.
Figure 2:
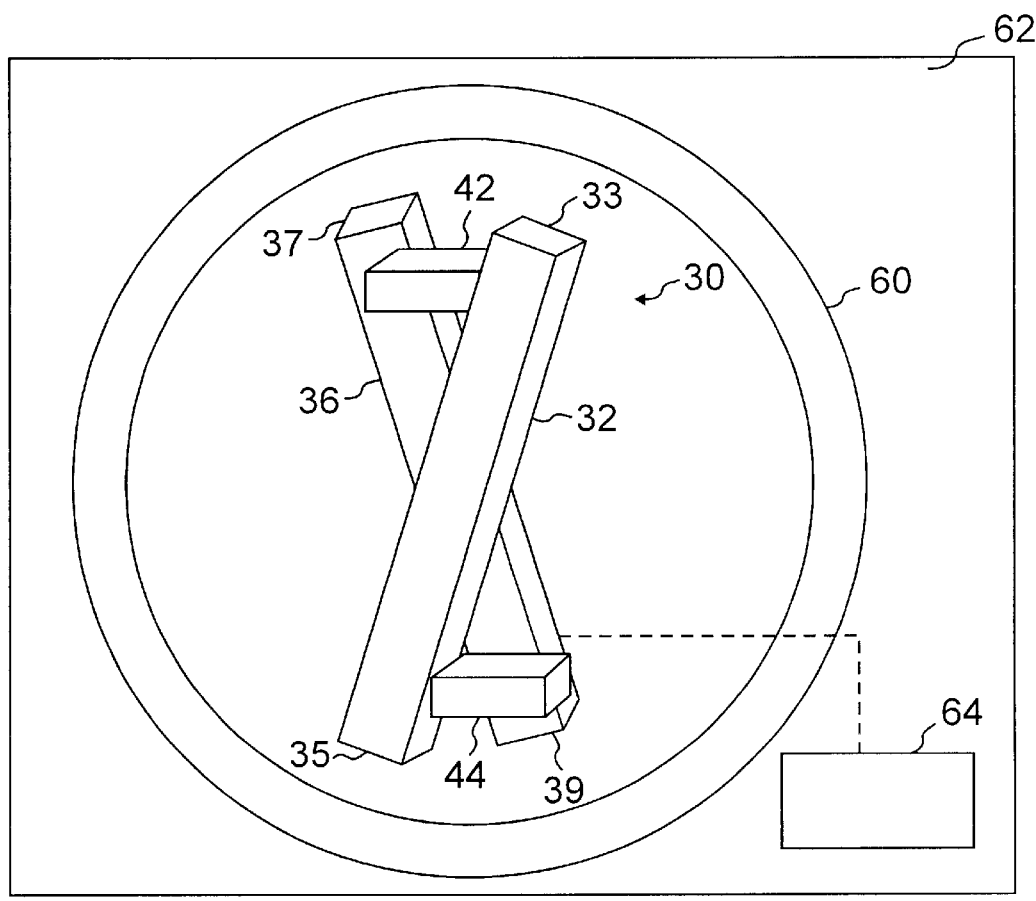
FIG. 2 is a perspective view of a rotational inchworm motor according to an embodiment the present invention.

FIG. 2 shows a rotational driver or rotator 30 having a first coupling member 32 and a second coupling member 36. The first coupling member 32 includes a top coupling end 33 and a bottom coupling end 35. The second coupling member 36 includes a top coupling end 37 and a bottom coupling end 39. The coupling members 32, 36 are adjustable in length. In specific embodiments, the coupling members 32, 36 are piezoelectric.

A top advancing member 42 is connected between the top coupling end 33 of the first coupling member 32 and the top coupling end 37 of the second coupling member 36. A bottom advancing member 44 is connected between the bottom coupling end 35 of the first coupling member 32 and the bottom coupling end 39 of the second coupling member 36. The advancing members 42, 44 are adjustable in length. In specific embodiments, the advancing members 42, 44 are piezoelectric. The advancing members 42, 44 are typically rotatably connected with the coupling members 32, 36 to allow for expansion and contraction of the members.

As shown in FIG. 2, the rotator 30 is used to rotate a ring 60 relative to a stationary member or housing 62. In a specific embodiment, the second coupling member 36 is attached to the stationary member 62. A controller 64 is provided to control the voltages supplied to the coupling members 32, 36 and the advancing members 42, 44 in a predetermined manner to adjust their lengths in sequence and produce the desired rotation.

Figure 3A:
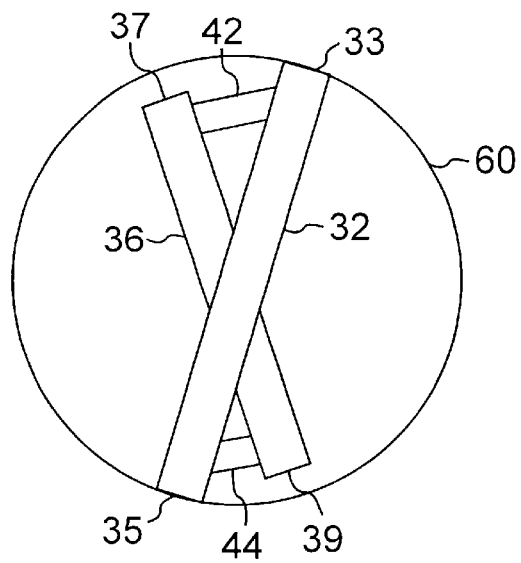
FIGS. 3a–3g are elevational views of the rotational inchworm motor of FIG. 2 illustrating operation thereof in a sequence of steps according to an embodiment of the present invention.
Figure 3B:
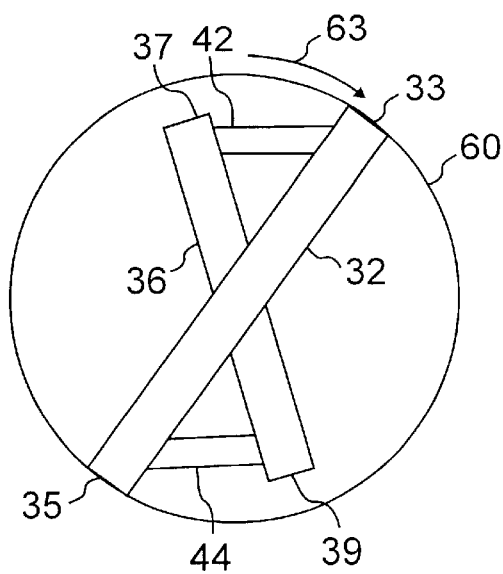

FIGS. 3a–3g illustrate the operation of the rotator 30. A voltage is applied to the first coupling member 32, causing it to expand so that the top coupling end 33 and the bottom coupling end 35 bear against the inner surface of the ring 60 in a coupled position, as shown in FIG. 3a. The second coupling member 36 is in a decoupled position. A voltage is applied to the advancing member 42, 44 causing them to expand, as seen in FIG. 3b. Because the second coupling member 36 is attached to the stationary member 62, the expansion of the advancing member 42, 44 rotate the first coupling member 32 and the ring 60 coupled therewith in the clockwise direction 63.

Figure 3C:
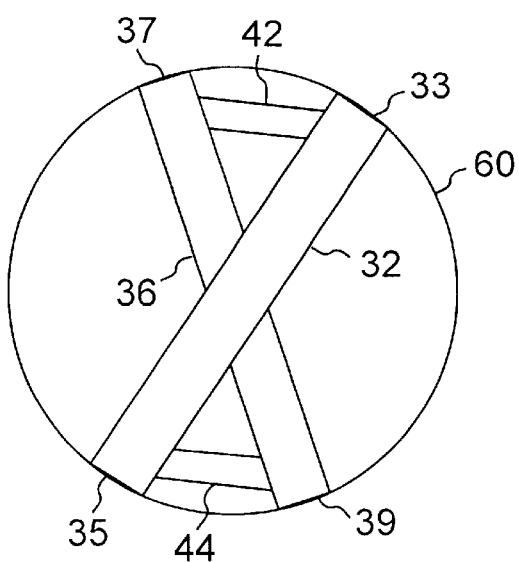
Figure 3D:
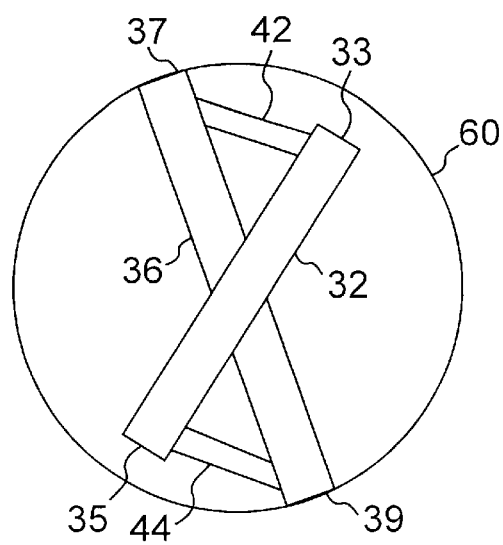
Figure 3E:
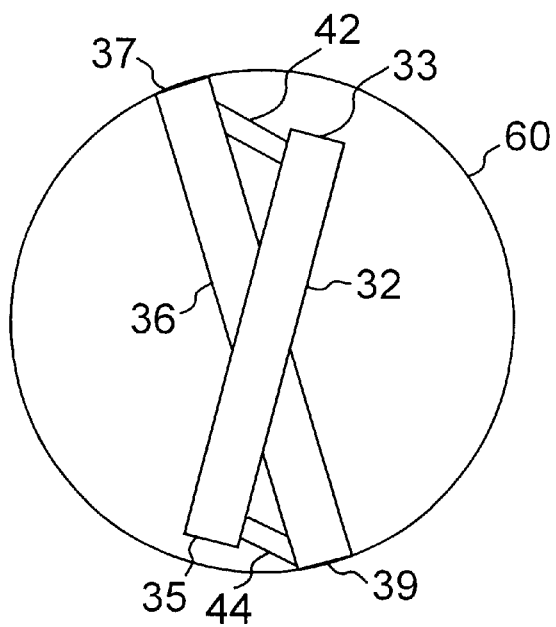
Figure 3F:
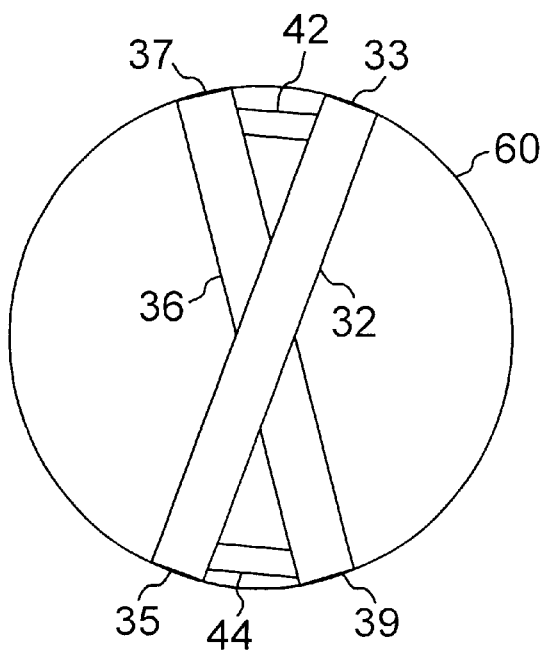
Figure 3G:
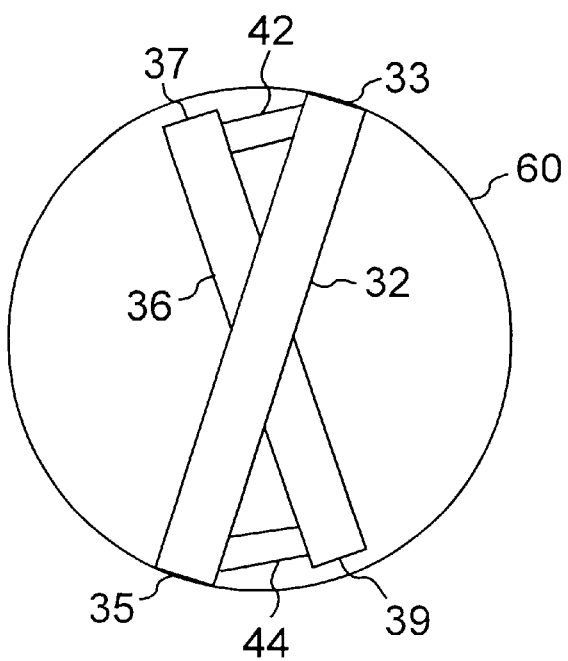

In FIG. 3c, a voltage is applied to the second coupling member 36, causing it to expand so that the top coupling end 37 and the bottom coupling end 39 bear against the inner surface of the ring 60 in a coupled position. The voltage on the first coupling member 32 is removed to decouple the first coupling member 32 from the ring 60 in a decoupled position, as seen in FIG. 3d. The voltage on the advancing members 42, 44 are also removed, causing the advancing members 42, 44 to contract to their original lengths, as shown in FIG. 3e. After the advancing members 42, 44 have contracted, a voltage is then applied to the first coupling member 32, causing it expand so that the top coupling end 33 and the bottom coupling end 35 bear against the inner surface of the ring 60 in a coupled position, as seen in FIG. 3f. The voltage on the second coupling member 36 is removed, causing it to contract and decouple from the ring 60, as shown in FIG. 3g. The sequence of steps outlined in FIGS. 3a–3g are repeated to rotate the ring 60 in the clockwise direction relative to the stationary member 62 in a worm-like manner.

Figure 4:
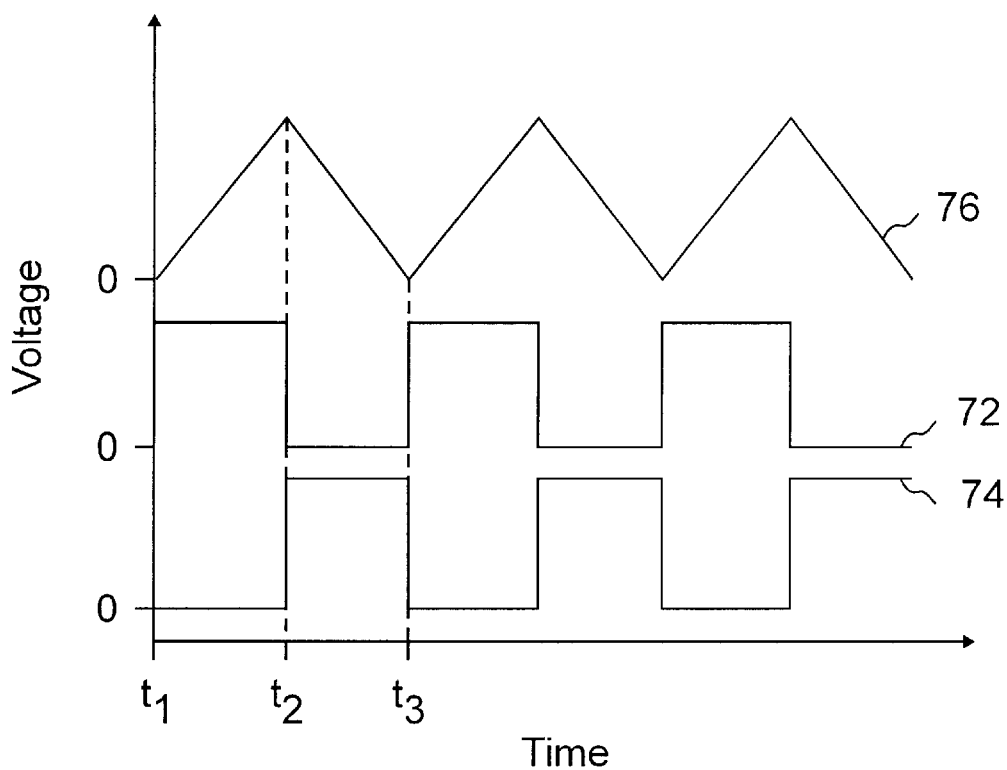
FIG. 4 shows the respective voltage waveforms generated during the operation sequence of FIGS. 3a–3g according to an embodiment of the invention.

FIG. 4 shows an example of the respective voltage waveforms generated during the operation sequence of FIGS. 3a–3g. Step voltage waveforms 72, 74 are used for the first and second coupling members 32, 36. A staircase voltage waveform 76 is applied to the advancing members 42, 44. Prior to application of the voltages, the coupling members 32, 36 are not coupled with the ring 60.

At time $t_1$, a voltage is applied to the first coupling member 32 according to the waveform 72 to couple the first coupling member 32 with the ring 60 (FIG. 3a). Also at time $t_1$, a voltage having a rising staircase waveform 76 is applied to the advancing members 42, 44 causing them to extend in length (FIG. 3b).

At time $t_2$, the voltage 76 applied to the advancing members 42, 44 reaches the upper limit, and a voltage is applied to the second coupling member 36 according to the waveform 74 to couple the second coupling member 36 with the ring 60 (FIG. 3c). At about the same time, the voltage to the first coupling member 32 is removed to decouple it from the ring 60 (FIG. 3d). The staircase waveform 76 reverses direction, causing contraction of the advancing members 42, 44 (FIG. 3e). It should be noted that the decoupling of the first coupling member 32 may occur shortly before or shortly after the coupling of the second coupling member 36 with the ring 60 and the contraction of the advancing members 42, 44. It may be desirable in some embodiments to decouple the first coupling member 32 from the ring 60 prior to coupling of the second coupling member 36 with the ring 60 to avoid unnecessary generation of stresses in the rotator 30. In that case, the rotator 30 changes position from FIG. 3b to FIG. 3d bypassing FIG. 3c.

At time $t_3$, the voltage 76 applied to the advancing members 42, 44 reaches the lower limit, and the voltage (waveform 74) applied to the second coupling member 36 is removed to decouple it from the ring 60 (FIG. 3g). The advancing members 42, 44 then expands on the rising slope of the voltage waveform 74. At time $t_3$, the voltage (waveform 72) is applied to the first coupling member 32 to couple the first coupling member 32 with the ring 60 (FIG. 3f). Again, the decoupling of the second coupling member 36 may occur shortly before or shortly after the coupling of the first coupling member 32 with the ring 60 and the expansion of the advancing members 42, 44. If the decoupling of the second coupling member 36 occurs before the coupling of the first coupling member 32, the rotator 30 will change position from FIG. 3e to FIG. 3g bypassing FIG. 3f.

Figure 5:
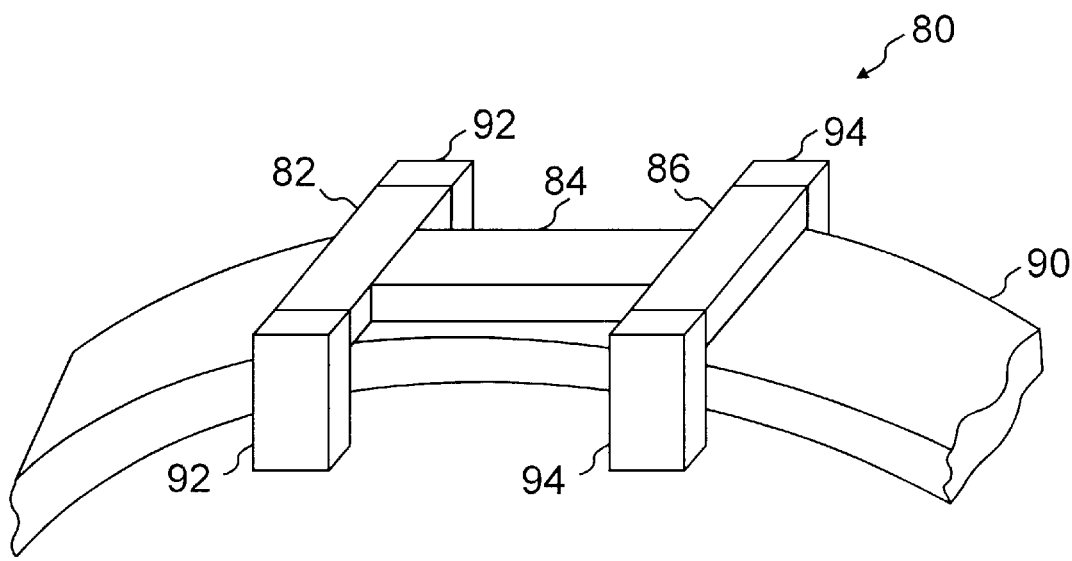
FIG. 5 is a perspective view of a rotational inchworm motor according to another embodiment of the present invention.

FIG. 5 illustrates another rotator 80 including a forward section 82, center section 84, and rear section 86 with respect to the desired direction of movement of a ring member 90 about which the rotator 80 is arranged.

In operation, a voltage is applied to the forward section 82, causing it to clamp the linear member 90 with a pair of grip members 92 attached to opposite ends of the forward section 82. A variable rate staircase voltage is applied to the center section 84 causing it to expand. The rear section 86 is attached to a housing or a stationary member. Thus, the expansion of the center section 84 drives the forward section 82 and the ring 90 in a forward direction. A voltage is then applied to the rear section 86, causing it to clamp the ring 90 with a pair of grip members 94 attached to opposite ends of the rear section 86. The voltage on the forward section 82 is removed, loosening the grip of the forward section 82 on the ring 90. The staircase voltage on the center section 84, its upper limit having been reached prior to or substantially simultaneous with the application of the voltage to the rear section 86, then starts downward towards its lower limit, causing the center section 84 to contract to its original length. After the center section 84 has contracted, a voltage is then applied to the forward section 82, causing it to clamp the ring 90, and the sequence of steps outlined above are repeated to move the ring 90 forward in a worm-like manner.

The above-described arrangements of apparatus and methods are merely illustrative of applications of the principles of this invention and many other embodiments and modifications may be made without departing from the spirit and scope of the invention as defined in the claims. For example, the ring may be replaced by another object having a different shape which is to be rotated. For the embodiment of FIG. 2, the rotation may be effected by adjusting the length of one or both of the advancing members. The coupling members may have equal or different original lengths prior to expansion; the advancing members may have equal or different original lengths prior to expansion. Moreover, the piezoelectric members may be replaced by other types of members that change in length due to mechanical energy, thermal energy, or the like. The scope of the invention should, therefore, be determined not with reference to the above description, but instead should be determined with reference to the appended claims along with their fall scope of equivalents.

What is claimed is:

1. A rotator for rotating a ring comprising:
    a first coupling member which is adjustable in length to move between a coupled position and a decoupled position, the first coupling member having top and bottom coupling ends being coupled with the ring in the coupled position and being decoupled from the ring in the decoupled position;
    a second coupling member which is adjustable in length to move between a coupled position and a decoupled position, the second coupling member having top and bottom coupling ends being coupled with the ring in the coupled position and being decoupled from the ring in the decoupled position;
    a top advancing member connected between the top coupling end of the first coupling member and the top coupling end of the second coupling member, the top advancing member being adjustable in length to move one top coupling end with respect to the other top coupling end; and
    a bottom advancing member connected between the bottom coupling end of the first coupling member and the bottom coupling end of the second coupling member, the bottom advancing member being adjustable in length to move one bottom coupling end with respect to the other bottom coupling end.

2. The rotator of claim 1 wherein the coupling members and advancing members are piezoelectric.

3. The rotator of claim 2 further comprising a controller controlling electrical voltages supplied to each of the coupling members and advancing members to adjust the lengths of the coupling members and advancing members.

4. The rotator of claim 3 wherein the controller is configured to rotate the coupling members relative to the ring by (a) moving the first coupling member to the coupled position and the second coupling member to the decoupled position; (b) adjusting the length of at least one of the advancing members to move the second coupling member relative to the first coupling member in rotation with respect to the ring; (c) moving the first coupling member to the decoupled position and the second coupling member to the coupled position; and (d) adjusting the length of at least one of the advancing members to move the first coupling member relative to the second coupling member in rotation with respect to the ring.

5. The rotator of claim 4 wherein the lengths of the top and bottom advancing members are increased in (b) to move the second coupling member relative to the first coupling member in rotation with respect to the ring.

6. The rotator of claim 4 wherein the lengths of the top and bottom advancing members are decreased in (d) to move the first coupling member relative to the second coupling member in rotation with respect to the ring.

7. The rotator of claim 1 wherein each of the first and second coupling members is coupled to the ring in the coupled position by increasing in length to press the top and bottom coupling ends against an inner surface of the ring.

8. The rotator of claim 1 wherein one of the coupling members is attached to a stationary support.

9. A rotator for rotating a ring comprising:
    a first piezoelectric coupling member which is adjustable in length to move between a coupled position and a decoupled position, the first coupling member having top and bottom coupling ends pressing against an inner surface of the ring in the coupled position and being spaced from the inner surface of the ring in the decoupled position;
    a second piezoelectric coupling member which is adjustable in length to move between a coupled position and a decoupled position, the second coupling member having top and bottom coupling ends pressing against the inner surface of the ring in the coupled position and being spaced from the inner surface of the ring in the decoupled position;
    means, coupled with the first and second piezoelectric coupling members, for moving one piezoelectric member with respect to the other piezoelectric member in rotation with respect to the ring.

10. The rotator of claim 9 wherein the means comprises first means, coupled with the top coupling end of the first coupling member and the top coupling end of the second coupling member, for moving one top coupling end with respect to the other top coupling end.

11. The rotator of claim 10 wherein the means comprises second means, coupled with the bottom coupling end of the first coupling member and the bottom coupling end of the second coupling member, for moving one bottom coupling end with respect to the other bottom coupling end.

12. The rotator of claim 10 further comprising control means for controlling at least one of the first means to move the top coupling end and the second means to move the bottom coupling end, with one of the coupling members being coupled with the ring in the coupled position and the other of the coupling members being decoupled from the ring in the decoupled position.

13. A method of rotating an object, the method comprising:
    (a) coupling a first coupling member to the object and decoupling a second coupling member from the object, the first coupling member including a top coupling end and a bottom coupling end, the second coupling member including a top coupling end connected with the top coupling end of the first coupling member by a top advancing member, and a bottom coupling end connected with the bottom coupling end of the first coupling member by a bottom advancing member;
    (b) adjusting a length of at least one of the advancing members to move the second coupling member relative to the first coupling member in rotation with respect to the object;
    (c) coupling the second coupling member to the object and decoupling the first coupling member from the object; and (d) adjusting the length of at least one of the advancing members to move the first coupling member relative to the second coupling member in rotation with respect to the object.

14. The method of claim 13 wherein the object is a ring, and wherein the first coupling member is coupled to the ring by pressing the top coupling end and the bottom coupling end of the first coupling member to an inner surface of the ring.

15. The method of claim 13 wherein the object is a ring, and wherein the second coupling member is coupled to the ring by pressing the top coupling end and the bottom coupling end of the second coupling member to an inner surface of the ring.

16. The method of claim 13 wherein the coupling members are piezoelectric.

17. The method of claim 13 wherein the advancing members are piezoelectric.

18. The method of claim 13 wherein the lengths of the top and bottom advancing members are increased in (b) to move the second coupling member relative to the first coupling member in rotation with respect to the object.

19. The method of claim 13 wherein the lengths of the top and bottom advancing members are decreased in (d) to move the first coupling member relative to the second coupling member in rotation with respect to the object.

20. The method of claim 13 further comprising attaching one of the coupling members to a stationary support.

* * * * *